US010477974B2

(12) United States Patent
Könker

(10) Patent No.: US 10,477,974 B2
(45) Date of Patent: Nov. 19, 2019

(54) OUTDOOR SEATING FURNITURE

(71) Applicant: Michael Könker, Bünde (DE)

(72) Inventor: Michael Könker, Bünde (DE)

(*) Notice: Subject to any disclaimer, the term of this patent is extended or adjusted under 35 U.S.C. 154(b) by 0 days.

(21) Appl. No.: 15/557,822

(22) PCT Filed: Mar. 17, 2016

(86) PCT No.: PCT/DE2016/000116
§ 371 (c)(1),
(2) Date: Sep. 13, 2017

(87) PCT Pub. No.: WO2016/146099
PCT Pub. Date: Sep. 22, 2016

(65) Prior Publication Data
US 2018/0338621 A1 Nov. 29, 2018

(30) Foreign Application Priority Data
Mar. 18, 2015 (DE) .................... 20 2015 002 065 U

(51) Int. Cl.
A47C 1/14 (2006.01)
A47C 7/66 (2006.01)
A47C 11/00 (2006.01)
A47C 7/56 (2006.01)
A47C 7/60 (2006.01)
(Continued)

(52) U.S. Cl.
CPC .................. A47C 7/66 (2013.01); A47C 1/14 (2013.01); A47C 7/563 (2013.01); A47C 7/566 (2013.01); A47C 7/60 (2013.01); A47C 11/005 (2013.01); F16B 1/00 (2013.01); A47C 1/121 (2013.01); F16B 2001/0035 (2013.01)

(58) Field of Classification Search
CPC .......... A47C 1/14; A47C 11/005; A47C 7/60; A47C 1/121
USPC ............... 297/311–383, 125, 344.23, 362.11
See application file for complete search history.

(56) References Cited

U.S. PATENT DOCUMENTS 5,328,239 A * 7/1994 Yamazaki ............... A47C 7/56
297/333
5,882,069 A * 3/1999 Gunnett ................. A47B 83/02
297/125
(Continued)

FOREIGN PATENT DOCUMENTS

DE 4143194 A1 7/1993
DE 29520027 U1 4/1996
DE 102006041640 A1 3/2008
(Continued)

OTHER PUBLICATIONS

International Search Report for PCT/DE2016/000116;2 pgs.

Primary Examiner — Syed A Islam
(74) Attorney, Agent, or Firm — Schmeiser, Olsen & Watts, LLP

(57) ABSTRACT

Outdoor seating furniture is provided, which includes at least one seat element arranged on a frame with a seat surface and a reverse side, wherein, in a basic state, the seat surface is oriented downwards and, in a functional state, the seat surface is oriented upwards. The seat element as part of a pivot bearing is pivotably mounted about the longitudinal axis of a transverse strut of the frame and is stabilized by force of gravity, force of spring, magnetic force and/or an electromechanical actuator in the basic state.

10 Claims, 1 Drawing Sheet

(51) Int. Cl.
*F16B 1/00* (2006.01)
*A47C 1/121* (2006.01)

(56) References Cited

U.S. PATENT DOCUMENTS 7,163,263 B1 * 1/2007 Kurrasch ............. A47C 1/0242
            297/217.3
8,388,056 B2 * 3/2013 Smith .................... A47C 4/286
            297/16.2

FOREIGN PATENT DOCUMENTS

FR         677480 A    3/1930
GB      190904279 A    2/1910

* cited by examiner

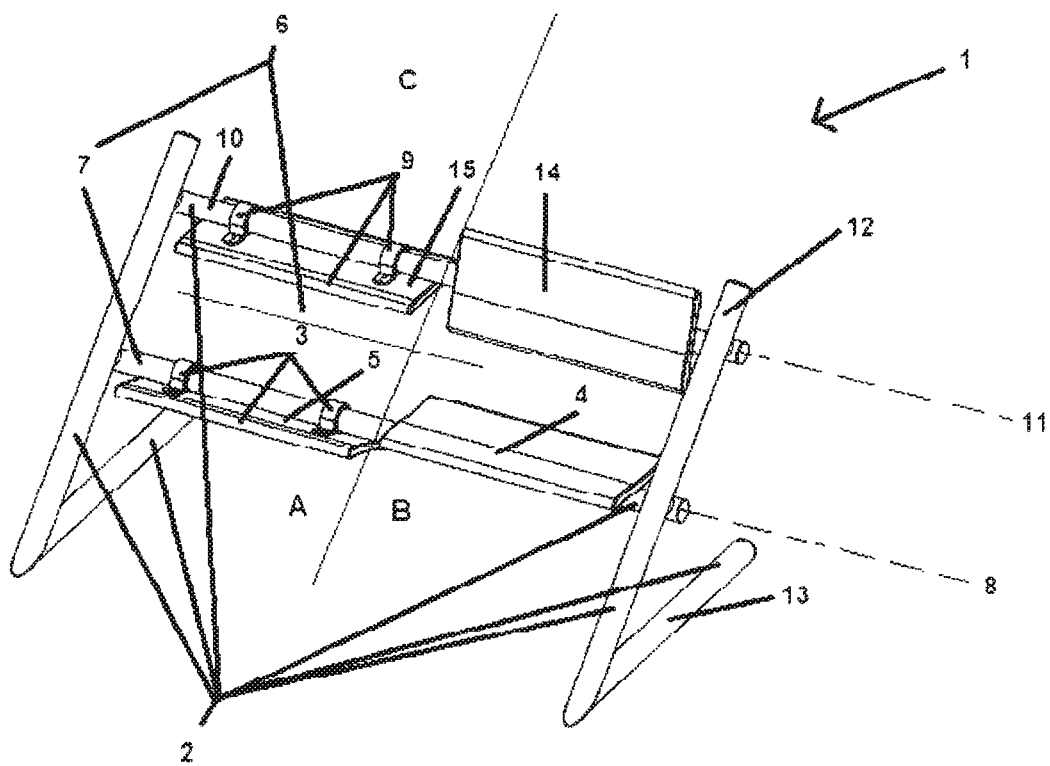

OUTDOOR SEATING FURNITURE

CROSS-REFERENCE TO RELATED APPLICATIONS

This application claims priority to PCT Application No. PCT/DE2016/000116, having a filing date of Mar. 17, 2016, based off of German application No. 20 2015 002 065.8 having a filing date of Mar. 18, 2015, the entire contents both of which are hereby incorporated by reference.

FIELD OF TECHNOLOGY

In the case of pieces of outdoor seating furniture, the problem exists that they are principally subjected to weather influences. For example, precipitation may cover the seat surface and it becomes necessary to remove precipitation from the seat surface before use, provided that it has not already been naturally dried by the wind or solar radiation. In addition, a seat surface located outdoors is also subject to becoming dirty due to pollen or bird droppings. Therefore, the need exists to protect the seat surfaces of the outdoor seating furniture from precipitation and from becoming dirty.

BACKGROUND

DE 41 43 194 A1 already discloses a solution for a bench, wherein the seat surface is connected to the backrest via a hinge so that the backrest can be laid onto the seat surface by folding it down, thereby providing protection. A very similar bench with a backrest that can be folded down is suggested by DE 295 20 027 U1. DE 10 2006 041 640 A1 also discloses a bench that has either a foldable backrest or a dual seat surface that are flexibly connected to one another and make it possible for a seat surface that has become wet to be covered by folding it up or down in such a way that it is possible to sit on a dry surface.

The known solutions have the disadvantage of the seating furniture concerned having to be proactively operated by hand by the user when leaving the seat so that the backrest can fulfil its function to protect the seat surface. Particularly in the case of seating furniture in the public sphere, that this is frequently forgotten is evident, since the previous user is mostly a different person than the subsequent user of the seating furniture. Therefore, the aim is to make outdoor seating furniture available, where the seat surface is principally protected without having to handle it after the use of the seating furniture.

SUMMARY

The outdoor seating furniture has one or a plurality of seating elements that are either designed to offer space for a single person or also for a plurality of people, depending on the requirements at hand. The seating element has a seat surface that can be anatomically shaped and a reverse side that is oppositely oriented to the seat surface. The reverse side must not necessarily be designed to be flat; it can also have curves or rectangular shapes, or have a semi-spherical shape for example. The seating element is situated on a frame by an appropriate means of connection, such as pipe brackets for example. Thereby, the seating element is pivotably mounted around the longitudinal axis of a transverse strut of the frame as part of a pivot bearing, whereby the transverse strut can be rigidly connected to the rest of the frame and the seating element can be pivotably connected to the transverse strut and the transverse strut can be pivotably connected to the rest of the frame and be rigidly connected to the seating element. The construction of the frame is favourably simplified if the transverse strut is a supporting part of the frame. So that the seat service is principally protected from precipitation and becoming dirty from above when not in use, the seat surface is oriented downwards in the basic state of the outdoor seating furniture. Thereby, the basic state is stabilized by gravity, spring force, magnetic force and/or an electromechanical actuator while the outdoor seating furniture is transferred into its functional state while the seat surface is oriented upwards manually or by triggering a turning mechanism before sitting down.

In the case of a simple embodiment, the centre of gravity of the seating element including the components situated along with it on the same side of the pivot bearing are located closer to the seat surface than the longitudinal axis of the transverse strut so that the centre of gravity is positioned above the longitudinal access in the functional state, meaning a seat surface oriented upwards or downwards. By means of this, the functional state is not stable when the outdoor seating furniture is not being used and the seating element collapses due to gravity so that the basic state of the outdoor seating furniture is achieved. Theoretically, it is conceivable that the seating element could also be balanced out in the case of a centre of gravity positioned above the longitudinal and pivot access, however, this possibility can be practically ignored since such balancing when standing up from the seating furniture alone could coincidentally take place. The already poor likelihood of staying in the functional state after use, which is undesired, can be further reduced by smooth-running bearings.

The centre of gravity can furthermore be situated by means of weight distribution outside of the level determined by the vertical direction and longitudinal axis, resulting in the seating element folding even easier from the functional into the basic state.

In addition or as an alternative to a transferring the outdoor seating furniture from its functional into its basic state by means of gravity, it is possible to combine the seating element with the frame via a drive element, by means of which force is exerted onto the seating element in order to achieve the stabilization of the basic state. In a simple embodiment, leaf springs are arranged on the rigid transverse strut on the left and right of the seating element, which are, for example, tensioned in such a way in the case of a seat surface oriented upwards, that they turn the seating element into the basic state when they are eased, making the seat surface orientate downwardly. In order to prevent that a user continues the rotary movement when turning the seat element into the functional state instead of carrying out a rotary movement in the opposite direction, with the risk of the leaf springs overstretching, it is favourable to attach a stopper to the rigid transverse strut that prevents overstretching of the leaf springs as a block. Naturally, the stopper can also be arranged at a different point of the frame, or also on the backrest element.

An interesting possibility for transferring the outdoor seating furniture from the functional state into the basic state can also be achieved, as described above, by means of combining a rotation of the seating element that is determined by gravity by correspondingly arranging the centre of gravity with a magnet, which, for example, can be attached to the rigidly designed transverse strut, thereby interacting with a metal surface on the reverse side in order to pull the seating element into a precisely horizontal position for example. The magnet/metal surface interaction areas are thereby preferably arranged orthogonally to the transverse strut. Thereby, at the same time, the stopper function can be fulfilled. Preferably, the magnet should be visible in the basic state, preferably being arranged on the reverse side so that the correct direction of rotation for the transfer into the functional state is evident to a user.

The drive element can also favourably be an electromagnetic actuator that stabilizes the outdoor seating furniture in the basic state using a low level of force that can be overcome manually by turning over the seating element. This solution is more elaborate because the actuator requires power. Preferably, this power is not externally supplied, but made available by means of the solar cells of a small photovoltaic system. Thereby, the solar cells are preferably arranged on the reverse side and the power pack is arranged on the frame. Under the term power pack, an energy storage system is generally intended, regardless of if it is rechargeable or not, but also batteries. It is particularly preferable for the power pack to be accommodated in a support beam with a corresponding lumen in the same way the drive unit of the actuator is. In order to achieve the least amount of energy consumption possible, it is favourable to equip the outdoor seating furniture with sensors, such as pressure sensors, on or in the stand space of the outdoor seating furniture for example. In this way, the drive unit of the actuator can then always be switched off if the pressure sensors register a pressure load occurring due to use of the seating furniture. Even more power is saved if, after the pressure sensor, which can also be arranged within the seating element, registers a relief in pressure, electricity only flows for a short time, being determined to flow long enough to bring about the basic state. Instead of pressure sensors, proximity sensory can also be used for example.

In order for the outdoor seating furniture to make sitting comfortably possible, it is favourable if it not only has a seating element, but also a backrest element. Such a backrest element can be rigidly situated on the frame or already be integrated into this. However, seating comfort is increased if the backrest element is situated as a separate component that can be pivoted around the longitudinal axis of an additional strut of the frame that runs parallel to the transverse strut so that the backrest element can be better adjusted to the back of the user. Furthermore, the advantage exists that the backrest element can be stabilized analogous to the seating element in the protective state in addition to the basic state of the outdoor seating furniture, where the backrest surface of the backrest element is oriented downwards.

The outdoor seating furniture can be equipped to be especially comfortable if, in the functional state, one or a plurality of heating elements are arranged under the seat surface that are powered by an external power supply or by means of a small photovoltaic system integrated into the furniture, whereby, a combination along with an electromechanical actuator, which stabilizes the basic state as described above, is naturally an elegant solution variant. Supplying power to the heating elements can also be coupled with pressure or proximity sensors so that heating only occurs when the seat surface concerned is actually being used. In the case of seating elements with a plurality of seat surfaces, it is favourable for each seat surface to be assigned a separately controllable heating element. The same applies to outdoor seating furniture with a plurality of seating elements as well.

Lastly, in a preferable embodiment, the outdoor seating furniture offers a base made of concrete or similar material, into which the support beam(s), preferably two support beams, join(s) at a 40~ to 60° angle, with a 50° being particularly preferable. The support beams can be screwed on or encased in concrete, or also be made of metal. Depending on the weight of the base or the bases, it is favourable for these two intersect the level formed by the vertical and longitudinal axis of the transverse strut. By encasing the support beams in concrete, the outdoor seating furniture can be set up particularly well at areas that are difficult to reach, such as at mountain-landscape viewpoints.

For a simple construction of the outdoor seating furniture, it is favourable if the transverse strut is a supporting part of the frame, being rigidly connected to the rest of the frame in most cases. In this way, the transverse struts can fulfil two primary functions, namely, on the one hand, to contribute to the resilient static equilibrium for seating purposes and, on the other, to serve as the basic component of the pivot bearing. The dual function of the transverse strut reduces the material use required and leads to low manufacturing costs.

In order to further increase the seating comfort of the outdoor seating furniture, movable and lockable weights can be arranged on the seating element or on components connected to this on the same side of the pivot bearing that enable the centre of gravity to be shifted. The adjustment options of such weights must naturally be limited, provided that the centre of gravity is used for the stabilization of the basic state by means of gravity. In addition or as an alternative to using weights to shift the centre of gravity, the seating element can also be arranged on the transverse strut so that it snaps into appropriate means of connection in the direction of the edge of the seat surface located in the front in the functional state, or in the centre or further back. In the case of a round transverse strut, for this purpose, the seating element can be formed out of plastic with corresponding recesses situated successively in a row with a semi-circle shape.

BRIEF DESCRIPTION

Some of the embodiments will be described in detail, with reference to the following figures, wherein like designations denote like members, wherein:

FIG. 1 shows a simple design of outdoor furniture (1) inclined toward the front.

DETAILED DESCRIPTION

The following can be recognized: the frame (2) with the support beams (12), bases (13), transverse strut (7), additional strut (10) and with two seating elements (3) and two backrest elements (9), of which a pair (3, 9), consisting of the seating element (3) and the backrest element (9), are arranged on the left of an auxiliary line that is almost perpendicular and another such pair (3, 9) on the right of this auxiliary line. Thereby, the two-pair outdoor seating furniture shown here is located left of the auxiliary line in the basic state (A) with relation to the seating element (3), in which the reverse side (5) of the seating element (3) is oriented upwards, as well as, with relation to the backrest element (9) in the protective state (C), in which the back side (15) is oriented upwards, and, with reference to the seating element (3), on the right of the auxiliary line in the functional state (B), in which the seat surface (4) is oriented upwards. The mixture of possible states shown here requires that the pair (3, 9) to the right of the auxiliary line is occupied by one person that is not shown here for the sake of illustrative clarity, while the pair (3, 9) to the left of the auxiliary line is unoccupied so that both the seat surface (4) and the backrest surface (14) are oriented downwards, thereby being protected from precipitation and the like. The basic state (A) is triggered automatically due to the centre of gravity of the seating element (3), which also comprises the corresponding means of connection, here being pipe brackets, since the seating element is part of the pivot bearing (6), which, on the one hand, is composed of the seating element (3) and, on the other hand, is composed of the transverse strut (7), thereby making it possible to swivel the seating element (3) around the longitudinal axis (8) of the transverse strut (7). The same applies to the protective state (C) engaging automatically with reference to the backrest element (9), which, along with a corresponding centre of gravity, is part of another pivot bearing composed of the backrest element (9) and the additional strut (10), thereby making it possible to swivel the backrest element (9) around the longitudinal axis (11) of the additional strut (10). The automatism results from the centre of gravity of the seating element (3) being located closer to the seat surface (4) than the longitudinal access (8) of the transverse strut (7), being unstably situated above the longitudinal axis (8) of the transverse strut (7) in relation to the seating element (3) in the functional state (B) and being stabilized by a person sitting on the seat surface (4). Here, the same applies to the protective state (C) with reference to the backrest element (9), which can be stabilized by the back of a person on the backrest surface (14) outside of the protective state (C).

LEGEND

1 Outdoor seating furniture
2 Frame
3 Seating element
4 Seat surface
5 Reverse side
6 Pivot bearing
7 Transverse strut
8 Longitudinal axis of the transverse strut
9 Backrest element
10 Additional strut
11 Longitudinal axis of the additional strut
12 Support beam A basic state
13 Foot B Functional state
14 Backrest C Protection state
15 Back side Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. Outdoor seating furniture that has at least one seating element arranged on a frame with a seat surface and a reverse side,
wherein the seat surface is oriented downwards in a stable basic state and the seat surface is oriented upwards in an instable functional state, wherein the seating element is pivotably mounted around the longitudinal axis of a transverse strut of the frame as part of a pivot bearing and is transferred and stabilized by the force of gravity, spring force, magnetic force and/or an electromechanical actuator in the basic state.

2. The outdoor seating furniture according to claim 1, wherein
the centre of gravity of the seating element including the components connected with this on the same side of the pivot bearing is located closer to the seat surface than the longitudinal axis and, in the instable functional state, is situated above the longitudinal axis.

3. The outdoor seating furniture according to claim 1 wherein,
when the seating element is horizontally oriented, the centre of gravity is located outside of the level determined by the vertical direction and the longitudinal axis.

4. The outdoor seating furniture according to claim 1, wherein
the seating element is connected to the frame via at least a single drive element, the drive element is connected to an electrical drive unit, the reverse side of the seating element has solar cells electrically connected to the drive unit and at least one proximity sensor connected to the drive unit.

5. The outdoor seating furniture according to claim 4, wherein
the drive element has a spring element that is tensioned in the functional state and in a state of relief in the basic state, the reverse side.

6. The outdoor seating furniture according to claim 1, wherein
at least one backrest element with a backrest surface and the backside is pivotably mounted around the longitudinal axis of an additional strut of the frame that is parallel to the transverse strut, where the backrest surface is oriented downwards in a stable protective state in addition to the stable state and the backrest surface is oriented upwards in an instable position outside of the protective state, where in the backrest element is transferred and stabilized analogous to the seating element by the force of gravity, spring force, magnetic force and/or an electromechanical actuator in the protective state.

7. The outdoor seating furniture according to claim 1, wherein
the spring element is arranged on the rigid transverse strut, tensioned in the functional state and transferring the seating element into the basic state upon removing of the tension.

8. The outdoor seating furniture according to claim 6, wherein
the spring element is arranged on the rigid additional strut, tensioned in the instable position outside of the protective state and transferring the backrest element into the protective state upon removing of the tension.

9. The outdoor seating furniture according to claim 1, wherein
within the support beam the drive unit is situated and/or a power pack, which is electrically connected to the solar cells.

10. The outdoor seating furniture according to claim 1, wherein
the seating element can be snapped into various positions of its reverse side on the transverse strut in order to shift the centre of gravity with reference to the transverse strut and with reference to the edge of its surface located in the front in the functional state.

* * * * *